US009707529B2

(12) United States Patent
Josseaux (10) Patent No.: US 9,707,529 B2
(45) Date of Patent: Jul. 18, 2017

(54) COMPOSITE SHAPED ABRASIVE PARTICLES AND METHOD OF FORMING SAME

(71) Applicant: Saint-Gobain Ceramics & Plastics, Inc., Worcester, MA (US)

(72) Inventor: Frederic Josseaux, Worcester, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 47 days.

(21) Appl. No.: 14/581,220

(22) Filed: Dec. 23, 2014

(65) Prior Publication Data

US 2016/0177153 A1 Jun. 23, 2016

(51) Int. Cl.
| | | |
|---|---|---|
| *B24D 3/00* | (2006.01) | |
| *B24D 3/02* | (2006.01) | |
| *B24D 11/00* | (2006.01) | |
| *B24D 18/00* | (2006.01) | |
| *B24B 1/00* | (2006.01) | |
| *C09K 3/14* | (2006.01) | |
| *B01J 2/26* | (2006.01) | |

(52) U.S. Cl.
CPC ............ *B01J 2/26* (2013.01); *B24D 11/001* (2013.01); *B24D 18/0063* (2013.01); *C09K 3/1409* (2013.01)

(58) Field of Classification Search
USPC .................................. 51/293, 295, 307, 309
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |

(Continued)

FOREIGN PATENT DOCUMENTS

| | | |
|---|---|---|
| CA | 743715 A | 10/1966 |
| CA | 2423788 A1 | 7/2002 |

(Continued)

OTHER PUBLICATIONS

"Investigation of Shaped Abrasive Particles vol. 1: Review of US Pat. No. 6,054,093 Apr. 25, 2000" © Apr. 2011, 5 pages.

(Continued)

*Primary Examiner* — James McDonough
(74) *Attorney, Agent, or Firm* — Abel Law Group, LLP; Adam Keser (57) ABSTRACT

An abrasive particle including a shaped abrasive particle having a body and a plurality of abrasive particles bonded to at least one surface of the body of the shaped abrasive particle.

24 Claims, 3 Drawing Sheets

(56) References Cited

U.S. PATENT DOCUMENTS

| | | |
|---|---|---|
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,860,721 A * | 8/1989 | Matsuda ............ B24D 5/12 125/15 |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A * | 4/1993 | Berg ............ B24D 3/14 264/6 |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A * | 9/1993 | Rue ............ C04B 35/1115 51/293 |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |

(56) References Cited

U.S. PATENT DOCUMENTS

| | | |
|---|---|---|
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A * | 2/1997 | Zeiringer ............ C04B 35/1115 501/127 |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,613,113 B2 | 9/2003 | Minick et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |

(56) References Cited

U.S. PATENT DOCUMENTS

| | | |
|---|---|---|
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0023376 A1 | 2/2011 | Linnenbrink |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |

(56) References Cited

U.S. PATENT DOCUMENTS

| | | |
|---|---|---|
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1* | 12/2016 | Nienaber ........... B24D 18/0072 |
| 2016/0362589 A1 | 12/2016 | Bauer et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0046374 A2 | 2/1982 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| NL | 171464 B | 11/1982 |
| WO | 9402559 A1 | 2/1994 |

(56) References Cited

FOREIGN PATENT DOCUMENTS

| | | |
|---|---|---|
| WO | 95/01241 A1 | 1/1995 |
| WO | 95/03370 | 2/1995 |
| WO | 95/18192 A1 | 7/1995 |
| WO | 9520469 A1 | 8/1995 |
| WO | 96/27189 A1 | 9/1996 |
| WO | 9714536 A1 | 4/1997 |
| WO | 9906500 A1 | 2/1999 |
| WO | 99/38817 A1 | 8/1999 |
| WO | 9938817 A1 | 8/1999 |
| WO | 9954424 A1 | 10/1999 |
| WO | 01/14494 A1 | 3/2001 |
| WO | 02097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/196795 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |

OTHER PUBLICATIONS

Austin, Benson M., "Thick-Film Screen Printing," Solid State Technology, Jun. 1969, pp. 53-58.
Avril, Nicholas Joseph, "Manufacturing Glass-fiber Reinforcement for Grinding Wheels," Massachusetts Institute of Technology, 1996, 105 pgs.
Bacher, Rudolph J., "High Resolution Thick Film Printing," E.I. du Pont de Nemours & Company, Inc., pp. 576-581, date unknown.
Besse, John R., "Understanding and controlling wheel truing and dressing forces when rotary plunge dressing," Cutting Tool Engineering, Jun. 2012, vol. 64, Issue 6, 5 pages.
Brewer, L. et al., Journal of Materials Research, 1999, vol. 14, No. 10, pp. 3907-3912.
Ciccotti, M. et al., "Complex dynamics in the peeling of an adhesive tape," International Journal of Adhesion & Adhesives 24 (2004) pp. 143-151.
Dupont, "Kevlar Aramid Pulp", Copyright 2011, DuPont, 1 page.
Wu, J. et al., Friction and Wear Properties of Kevlar Pulp Reinforced Epoxy.
J. European Ceramic Society 31, Abstract only (2011) 2073-2081.
Riemer, Dietrich E., "Analytical Engineering Model of the Screen Printing Process: Part II," Solid State Technology, Sep. 1988, pp. 85-90.
Miller, L.F., "Paste Transfer in the Screening Process," Solid State Technology, Jun. 1969, pp. 46-52.
Morgan, P. et al., "Ceramic Composites of Monazite and Alumina," J. Am. Ceram. Soc., 78, 1995, 1553-63.
Riemer, Dietrich E., "Analytical Engineering Model of the Screen Printing Process: Part I," Solid State Technology, Aug. 1988, pp. 107-111.
WINTER Catalogue No. 5, Dressing tools, WINTER diamond tools for dressing grinding wheels, 140 pages.
Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.
3M Cubitron II Abrasive Belts Brochure, Shaping the Future, Jan. 2011, 6 pages.
Vanstrum et al., Precisely Shaped Grain (PSG): 3M's Innovation in Abrasive Grain Technology, date unknown, 1 page.
Graf, "Cubitron II: Precision-Shaped Grain (PSG) Turns the Concept of Gear Grinding Upside Down," gearsolutions.com, May 2014, pp. 36-44.

(56) References Cited

OTHER PUBLICATIONS

DOW Machine Tool Accessories, Grinding & Surface Finishing, www.1mta.com, Nov. 2014, 72 pages.
International Search Report for Application No. PCT/US2015/000190, dated Apr. 1, 2016, 1 page.

* cited by examiner

COMPOSITE SHAPED ABRASIVE PARTICLES AND METHOD OF FORMING SAME

BACKGROUND

Field of the Disclosure

The following is directed to shaped abrasive particles, and more particularly, to composite shaped abrasive particles having certain features and methods of forming such composite shaped abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

SUMMARY

According to a first aspect, a method of forming an abrasive particle comprises forming a shaped abrasive particle having a body and attaching a plurality of abrasive particles to at least one surface of the body to form a composite abrasive particle including the shaped abrasive particle and the plurality of abrasive particles.

In another aspect, an abrasive particle includes a shaped abrasive particle comprising a body; and a plurality of abrasive particles bonded to at least one surface of the body of the shaped abrasive particle.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to methods of forming shaped abrasive particles, and more particularly composite shaped abrasive particles including shaped abrasive particles and a plurality of abrasive particles overlying at least one surface of the body of the shaped abrasive particle. The abrasive particles of the embodiments herein may be used in various abrasive articles, including for example bonded abrasive articles, coated abrasive articles, and the like. Alternatively, the shaped abrasive particle fractions of the embodiments herein may be utilized in free abrasive technologies, including for example grinding and/or polishing slurries.

The abrasive particles of the embodiments herein may be obtained through various processing methods, including but not limited to, printing, molding, pressing, stamping, casting, extruding, cutting, fracturing, heating, cooling, crystallizing, rolling, embossing, depositing, etching, scoring, drying, and a combination thereof. Particular methods of forming the shaped abrasive particles can include the formation of a mixture, such as a sol-gel, that can be shaped in an opening of a production tooling (e.g., a screen or mold), and formed into a precursor shaped abrasive particle. Screen printing methods of forming shaped abrasive particles are generally described in U.S. Pat. No. 8,753,558. A suitable method of forming shaped abrasive particles according to a conventional molding process is described in U.S. Pat. No. 5,201,916.

Figure 1:
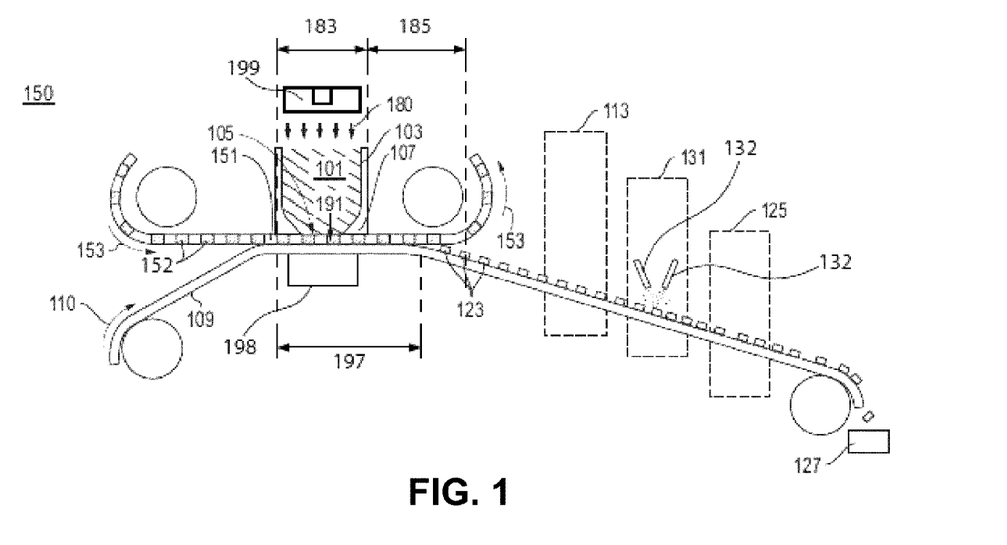
FIG. 1 includes a portion of a system for forming shaped abrasive particle fractions in accordance with an embodiment.

According to one particular embodiment, the process of forming the shaped abrasive particles can be a screen printing process. FIG. 1 includes an illustration of a system 150 for forming composite shaped abrasive particles in accordance with one, non-limiting embodiment. The process of forming composite shaped abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to substantially hold a given shape even in the green (i.e., unfired) state. In accordance with an embodiment, the gel can be formed of the ceramic powder material as an integrated network of discrete particles.

The mixture 101 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object.

The mixture 101 can be formed to have a particular content of solid material, such as the ceramic powder material. For example, in one embodiment, the mixture 101 can have a solids content of at least about 25 wt %, such as at least about 35 wt %, or even at least about 38 wt % for the total weight of the mixture 101. Still, in at least one non-limiting embodiment, the solids content of the mixture 101 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solid material in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being Al2O3.H2O and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 101 can be formed to have a particular content of liquid material. Some suitable liquids may include water. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1 \times 10^4$ Pa, such as at least about $4 \times 10^4$ Pa, or even at least about $5 \times 10^4$ Pa. However, in at least one non-limiting embodiment, the mixture 101 may have a storage modulus of not greater than about $1 \times 10^7$ Pa, such as not greater than about $2 \times 10^6$ Pa. It will be appreciated that the storage modulus of the mixture 101 can be within a range between any of the minimum and maximum values noted above.

The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the gel into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 101 can have a particular viscosity. For example, the mixture 101 can have a viscosity of at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In one non-limiting embodiment, the mixture 101 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 101 can be within a range between any of the minimum and maximum values noted above. The viscosity can be measured in the same manner as the storage modulus as described above.

Moreover, the mixture 101 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 101 that can be distinct from slurries used in conventional forming operations. For example, the content of organic materials within the mixture 101 and, in particular, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.01 wt %, such as at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 101 can have a pH of less than about 5, and more particularly, can have a pH within a range between about 2 and about 4.

The system 150 of FIG. 1, can include a die 103. As illustrated, the mixture 101 can be provided within the interior of the die 103 and configured to be extruded through a die opening 105 positioned at one end of the die 103. As further illustrated, extruding can include applying a force 180 (such as a pressure) on the mixture 101 to facilitate extruding the mixture 101 through the die opening 105. During extrusion within an application zone 183, a production tool or production tool 151 can be in direct contact with a portion of a belt 109. The screen printing process can include extruding the mixture 101 from the die 103 through the die opening 105 in a direction 191. In particular, the screen printing process may utilize the production tool 151 such that, upon extruding the mixture 101 through the die opening 105, the mixture 101 can be forced into an opening 152 in the production tool 151.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 101 and across the width of the die 103 can facilitate improved processing control and improved dimensional characteristics of the shaped abrasive particles.

Figure 2:
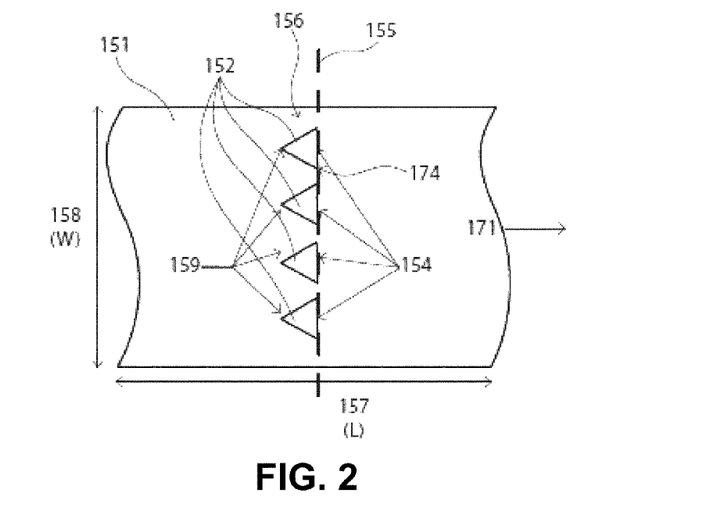
FIG. 2 includes a portion of the system of FIG. 1 according to an embodiment.

Referring briefly to FIG. 2, a portion of the production tool (e.g., screen) 151 is illustrated. As shown, the production tool 151 can include the opening 152, and more particularly, a plurality of openings 152 extending through the volume of the production tool 151. In accordance with an embodiment, the openings 152 can have a two-dimensional shape as viewed in a plane defined by the length (l) and width (w) of the screen. The two-dimensional shape can include various shapes such as, for example, polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as a triangle, a rectangle, a quadrilateral, a pentagon, a hexagon, a heptagon, an octagon, a nonagon, a decagon, and a combination thereof.

As further illustrated, the production tool 151 can have openings 152 that are oriented in a particular manner relative to each other. As illustrated and in accordance with one embodiment, each of the openings 152 can have substantially the same orientation relative to each other, and substantially the same orientation relative to the surface of the production tool 151. For example, each of the openings 152 can have a first edge 154 defining a first plane 155 for a first row 156 of the openings 152 extending laterally across a lateral axis 158 of the production tool 151. The first plane 155 can extend in a direction substantially orthogonal to a longitudinal axis 157 of the production tool 151. However, it will be appreciated, that in other instances, the openings 152 need not necessarily have the same orientation relative to each other.

Moreover, the first row 156 of openings 152 can be oriented relative to a direction of translation to facilitate particular processing and controlled formation of shaped abrasive particles. For example, the openings 152 can be arranged on the production tool 151 such that the first plane 155 of the first row 156 defines an angle relative to the direction of translation 171. As illustrated, the first plane 155 can define an angle that is substantially orthogonal to the direction of translation 171. Still, it will be appreciated that in one embodiment, the openings 152 can be arranged on the production tool 151 such that the first plane 155 of the first row 156 defines a different angle with respect to the direction of translation, including for example, an acute angle or an obtuse angle. Still, it will be appreciated that the openings 152 may not necessarily be arranged in rows. The openings 152 may be arranged in various particular ordered distributions with respect to each other on the production tool 151, such as in the form of a two-dimensional pattern. Alternatively, the openings may be disposed in a random manner on the production tool 151.

Referring again to FIG. 1, after forcing the mixture 101 through the die opening 105 and a portion of the mixture 101 through the openings 152 in the production tool 151, one or more precursor shaped abrasive particles 123 may be printed on the belt 109 disposed under the production tool 151. According to a particular embodiment, the precursor shaped abrasive particles 123 can have a shape substantially replicating the shape of the openings 152. Notably, the mixture 101 can be forced through the production tool 151 in rapid fashion, such that the average residence time of the mixture 101 within the openings 152 can be less than about 2 minutes, less than about 1 minute, less than about 40 seconds, or even less than about 20 seconds. In particular non-limiting embodiments, the mixture 101 may be substantially unaltered during printing as it travels through the screen openings 152, thus experiencing no change in the amount of components from the original mixture, and may experience no appreciable drying in the openings 152 of the production tool 151.

Additionally, the system 151 can include a bottom stage 198 within the application zone 183. During the process of forming shaped abrasive particles, the belt 109 can travel over the bottom stage 198, which can offer a suitable substrate for forming.

During operation of the system 150, the production tool 151 can be translated in a direction 153 while the belt 109 can be translated in a direction 110 substantially similar to the direction 153, at least within the application zone 183, to facilitate a continuous printing operation. As such, the precursor shaped abrasive particles 123 may be printed onto the belt 109 and translated along the belt 109 to undergo further processing. It will be appreciated that such further processing can include processes described in the embodiments herein, including for example, shaping, application of other materials (e.g., plurality of abrasive particles), drying, sintering, and the like.

In some embodiments, the belt 109 and/or the production tool 151 can be translated while extruding the mixture 101 through the die opening 105. As illustrated in the system 100, the mixture 101 may be extruded in a direction 191. The direction of translation 110 of the belt 109 and/or the production tool 151 can be angled relative to the direction of extrusion 191 of the mixture 101. While the angle between the direction of translation 110 and the direction of extrusion 191 is illustrated as substantially orthogonal in the system 100, other angles are contemplated, including for example, an acute angle or an obtuse angle.

The belt 109 and/or the production tool 151 may be translated at a particular rate to facilitate processing. For example, the belt 109 and/or the production tool 151 may be translated at a rate of at least about 3 cm/s. In other embodiments, the rate of translation of the belt 109 and/or the production tool 151 may be greater, such as at least about 4 cm/s, at least about 6 cm/s, at least about 8 cm/s, or even at least about 10 cm/s. Still, in at least one non-limiting embodiment, the belt 109 and/or the production tool 151 may be translated in a direction 110 at a rate of not greater than about 5 m/s, not greater than about 1 m/s, or even not greater than about 0.5 m/s. It will be appreciated that the belt 109 and/or the production tool 151 may be translated at a rate within a range between any of the minimum and maximum values noted above, and moreover, may be translated at substantially the same rate relative to each other. Furthermore, for certain processes according to embodiments herein, the rate of translation of the belt 109 as compared to the rate of extrusion of the mixture 101 in the direction 191 may be controlled to facilitate proper processing.

After the mixture 101 is extruded through the die opening 105, the mixture 101 may be translated along the belt 109 under a knife edge 107 attached to a surface of the die 103. The knife edge 107 may define a region at the front of the die 103 that facilitates displacement of the mixture 101 into the openings 152 of the production tool 151.

Certain processing parameters may be controlled to facilitate formation of particular features of the precursor shaped abrasive particles 123 and the finally-formed shaped abrasive particle fractions described herein. Some exemplary process parameters that can be controlled include a release distance 197, a viscosity of the mixture, a storage modulus of the mixture, mechanical properties of the bottom stage, geometric or dimensional characteristics of the bottom stage, thickness of the production tool, rigidity of the production tool, a solid content of the mixture, a carrier content of the mixture, a release angle, a translation speed, a temperature, a content of release agent, a pressure exerted on the mixture, a speed of the belt, a drying rate, a drying time, a drying temperature, and a combination thereof.

According to one embodiment, one particular process parameter can include controlling the release distance 197 between a filling position and a release position. In particular, the release distance 197 can be a distance measured in a direction 110 of the translation of the belt 109 between the end of the die 103 and the initial point of separation between the production tool 151 and the belt 109.

After extruding the mixture 101 into the openings 152 of the production tool 151, the belt 109 and the production tool 151 may be translated to a release zone 185 where the belt 109 and the production tool 151 can be separated to facilitate the formation of the precursor shaped abrasive particles 123. In accordance with an embodiment, the production tool 151 and the belt 109 may be separated from each other within the release zone 185 at a particular release angle.

Thereafter, the precursor shaped abrasive particles 123 may be translated through a series of optional zones wherein various treating processes may be conducted. Some suitable exemplary treating processes can include drying, heating, curing, reacting, radiating, mixing, stirring, agitating, planarizing, calcining, sintering, comminuting, sieving, doping, application of other abrasive particles to the body of the precursor shaped abrasive particles and a combination thereof. According to one embodiment, the precursor shaped abrasive particles 123 may be translated through an optional shaping zone 113, wherein at least one exterior surface of the particles may be shaped as described in embodiments herein. Furthermore, the precursor shaped abrasive particles 123 may be translated through an optional application zone 131, wherein a material, such as a dopant material and/or a plurality of abrasive particles can be applied to at least one exterior surface of the precursor shaped abrasive particles 123 as described in embodiments herein.

After forming precursor shaped abrasive particles 123, the particles may be translated through a post-forming zone 125. Various processes may be conducted in the post-forming zone 125, including treatment of the precursor shaped abrasive particles 123. In one embodiment, the post-forming zone 125 can include a heating process where the precursor shaped abrasive particles 123 may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above. Furthermore, the precursor shaped abrasive particles 123 may be translated through the post-forming zone 125 at a particular rate, such as at least about 0.2 feet/min and not greater than about 8 feet/min.

Furthermore, the drying process may be conducted for a particular duration. For example, the drying process may be not greater than about 6 hours, such as not greater than about 5 hours, not greater than about 4 hours, not greater than about 2 hours, or even not greater than about 1 hour. Still, the drying process, may be at least about 1 minute, such as at least about 15 minutes or at least about 30 minutes. It will be appreciated that the drying duration may be within a range between any of the minimum and maximum temperatures noted above. For example, in at least one embodiment, the precursor shaped abrasive particles can be dried for a duration of 1 to 10 minutes, which may facilitate intentional fracturing at a predetermined stress concentration point and along a predetermined stress concentration vector.

After the precursor shaped abrasive particles 123 are translated through the post-forming zone 125, the precursor shaped abrasive particles 123 may be removed from the belt 109. The precursor shaped abrasive particles 123 may be collected in a bin 127 for further processing.

In accordance with an embodiment, the process of forming shaped abrasive particles may further comprise a sintering process. For certain processes of embodiments herein, sintering can be conducted after collecting the precursor shaped abrasive particles 123 from the belt 109. Alternatively, the sintering may be a process that is conducted while the precursor shaped abrasive particles 123 are on the belt 109. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

According to one embodiment, the process of forming the abrasive particles can include forming a precursor shaped abrasive particle 123 and attaching a plurality of abrasive particles to at least one surface of the body of the precursor shaped abrasive particle 123. In certain instances, the process of attaching can happen in the application zone 131, wherein one or more application heads 132 can facilitate deposition of the plurality of abrasive particles onto the major exterior surfaces (e.g., the upper surfaces) of the precursor shaped abrasive particles 123. Various suitable processes for attaching the plurality of abrasive particles can include deposition processes such as blasting, projecting, pressing, gravity coating, molding, stamping, and a combination thereof. The deposition of the plurality of abrasive particles may include the use of a carrier, which may be a liquid or gas that facilitates carrying of the plurality of abrasive particles to the one or more surfaces of the precursor shaped abrasive particles 123. For example, in at least one embodiment, the plurality of abrasive particles may be forcefully ejected from the applications heads 132 by a gas carrier to facilitate deposition of the plurality of abrasive particles onto the one or more surfaces of the precursor shaped abrasive particles 123.

According to another embodiment, the process of attaching the plurality of abrasive particles to the body of the precursor shaped abrasive particles can include deposition of the mixture onto a layer of abrasive particles including the plurality of shaped abrasive particles. For example, the production tool can be prepared to have a layer of abrasive particles contained on a surface, onto which the mixture is shaped in the form of a precursor shaped abrasive particle, such that the mixture is deposited directly onto the plurality of abrasive particles. In such instances, the process of shaping of the precursor shaped abrasive particle and the attachment of the plurality of abrasive particles can be completed simultaneously. For one particular example, the upper surface of the belt 109 can be prepared to contain a layer of abrasive particles and the mixture 101 can be extruded into the openings 152 of the production tool 151 and onto the layer of abrasive particles on the upper surface of the belt 109. The production tool 151 can then be removed from the belt 109 and the precursor shaped abrasive particles 123 can have a plurality of abrasive particles attached to their bottom surface, which is adjacent the belt 109. It will be appreciated that additional processes can be used to attach the plurality of abrasive particles to other surfaces, including a deposition process that attaches a plurality of abrasive particles to the upper surface of the precursor shaped abrasive particles. It is contemplated that one or more processes can be used to attach a plurality of abrasive particles to one or more surfaces of the body of the precursor shaped abrasive particles, including but not limited to the bottom surface, the upper surface, and side surfaces.

In at least one embodiment, the process of attaching the plurality of abrasive particles to the bodies of the precursor shaped abrasive particles can occur prior to substantial drying of the body. Notably, in certain instances, some moisture in the precursor shaped abrasive particles may facilitate suitable attachment of the plurality of abrasive particles. According to one embodiment, the process of attachment can occur such that the moisture content (i.e., weight percent of liquid) of the precursor shaped abrasive particle during attachment can be not greater than about 70% different than the moisture content of the mixture 101 when it is placed in the production tool 151. The percent difference can be calculated according to the formula $[(Mc1-Mc2)/Mc1] \times 100\%$, where $Mc1$ is the moisture content of the mixture 101 during placement into the production tool 151 and $Mc2$ is the moisture content of the precursor shaped abrasive particle during attachment. In other instances, the moisture content of the precursor shaped abrasive particle during attachment can be not greater than about 60% different, such as not greater than about 50% different, not greater than about 40% different, not greater than about 30% different, not greater than about 20% different, or even not greater than about 10% different than the moisture content of the mixture 101 when it is placed into the production tool 151. Still, in at least one non-limiting embodiment, the moisture content of the precursor shaped abrasive particle during attachment can be substantially the same or exactly the same as the moisture content of the mixture 101 when it is placed into the production tool 151.

In at least one embodiment, the process of attaching the plurality of abrasive particles to the bodies of the precursor shaped abrasive particle can include humidifying the surface of the precursor shaped abrasive particle prior to attachment of the abrasive particles. For example, the moisture content at the surface of the precursor shaped abrasive particles can be increased prior to the attachment process, such that the moisture content can be nearly the same as the moisture content of the mixture 101 when it is disposed in the production tool 151.

In one embodiment, the process can include drying the precursor shaped abrasive particles and plurality of abrasive particles after attaching the plurality of abrasive particles to the precursor shaped abrasive particles. Moreover, it will be appreciated that in certain instances, the process can include calcining the precursor shaped abrasive particle and plurality of abrasive particles after attaching the plurality of abrasive particles to the precursor shaped abrasive particles. Moreover, the process can include sintering the precursor shaped abrasive particle and plurality of abrasive particles after attaching the plurality of abrasive particles to the precursor shaped abrasive particles to form a composite shaped abrasive particle.

Figure 3:
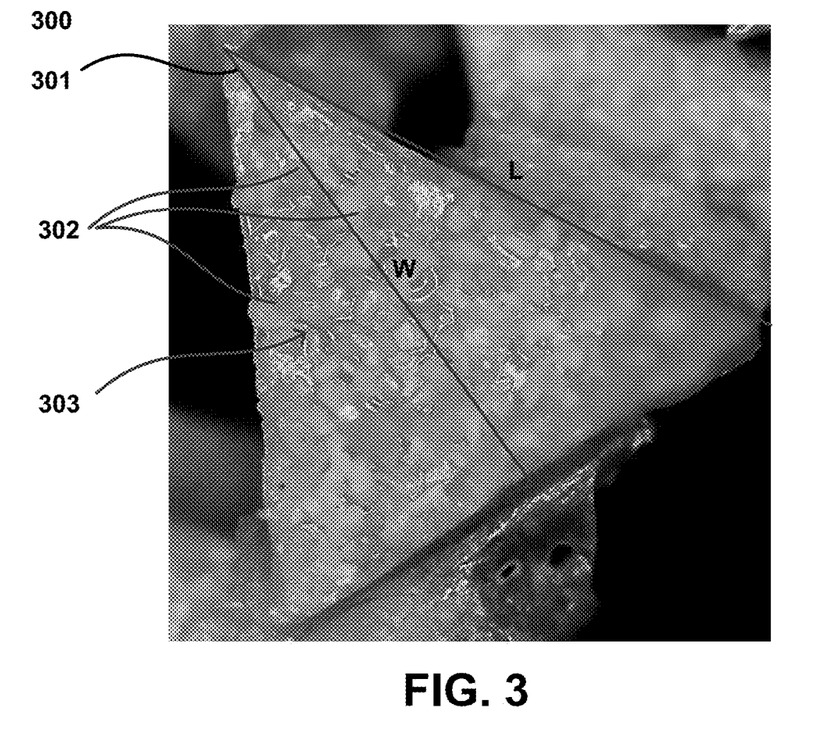
FIG. 3 includes an image of an abrasive particle according to an embodiment.

FIG. 3 includes an image of an abrasive particle according to an embodiment. The abrasive particle can be a composite shaped abrasive particle 300 including a shaped abrasive particle having a body 301 and a plurality of abrasive particles 302 attached to at least one surface 303, such as a major surface 303 of the body 301 of the shaped abrasive particle. As shown, the shaped abrasive particle can have a triangular two-dimensional shape as viewed in a plane defined by a length (L) and a width (W) of the body 301. However, it will be appreciated that the shaped abrasive particles can have other two dimensional shapes, including but not limited to polygons, ellipsoids, numerals, Greek alphabet characters, Latin alphabet characters, Russian alphabet characters, complex shapes having a combination of polygonal shapes, and a combination thereof.

According to one embodiment, the plurality of abrasive particles 302 can be bonded to a major surface of the body 301. In other instances, the plurality of abrasive particles 302 can be bonded to at least two surfaces of the body. For example, the plurality of abrasive particles 302 can be bonded to at least two major surfaces of the body 301, such as those surfaces having the greatest surface area compared to all surfaces of the body 301, which in the particle of FIG. 3 can include the bottom surface and an upper surface. In still other embodiments, the plurality of abrasive particles 302 can be bonded to at least two surfaces of the body 301, which can include one or more side surfaces. For example, the plurality of abrasive particles 302 can be bonded to an upper surface and a side surface of the body 301. Alternatively, the plurality of abrasive particles 302 can be bonded to a bottom surface and a side surface of the body 301. It will be appreciated that in at least one embodiment, the plurality of abrasive particles 302 can be attached to all of the surfaces of the body 301 of the shaped abrasive particle.

For certain composite abrasive particles of the embodiments herein, the plurality of abrasive particles 302 can cover at least about 50% of the total surface area of the body 301 of the shaped abrasive particle. In other instances, the plurality of abrasive particles 302 can be greater, such as at least about 60%, at least about 70%, at least about 80%, at least about 90% or even at least about 95% of the total surface area of the body 301 of the shaped abrasive particle. Still, in at least one embodiment, the plurality of abrasive particles 302 can cover not greater than about 99% of the total surface area of the body 301 of the shaped abrasive particle. It will be appreciated that the plurality of abrasive particles 302 can cover a percentage of the total surface area of the body 301 of the shaped abrasive particle within a range including any of the minimum and maximum values noted above.

According to one embodiment, the plurality of abrasive particles 302 can account for at least about 10 wt % of a total weight of the composite abrasive particle 300. In other instances, the plurality of abrasive particles 302 can account for at least about 20 wt %, such as at least about 30 wt %, at least about 40 wt %, or even at least about 50 wt % of the total weight of the composite abrasive particle 300. Still, in a non-limiting embodiment, the plurality of abrasive particles 302 can be not greater than about 80 wt %, such as not greater than about 60 wt %, not greater than about 40 wt %, not greater than about 30 wt %, or even not greater than about 20 wt % of a total weight of the composite abrasive particle 300. It will be appreciated that the plurality of abrasive particles 302 can account for a particular weight percent of the total weight of the composite abrasive particle within a range including any of the minimum and maximum percentages noted above.

The plurality of abrasive particles 302 may be selected from a particular type of material to facilitate suitable formation of the composite shaped abrasive particles. For example, the plurality of abrasive particles 302 can include a material from the group of oxides, carbides, nitrides, borides, oxycarbides, oxynitrides, oxyborides, natural minerals, synthetic materials, carbon-based materials, and a combination thereof. In one particular embodiment, the plurality of abrasive particles can include alumina, and more particularly can consist essentially of alpha alumina.

For at least one embodiment, the plurality of abrasive particles 302 can include a material having a particular coefficient of thermal expansion (CTE) relative to the CTE of the body 301 that can facilitate improved forming, deployment, and/or performance of the composite abrasive particle. For example the plurality of abrasive particles 302 can have a CTE that is not greater than about 50% different than a CTE of the body 301 of the shaped abrasive particle according to the formula [(CTE1−CTE2)/CTE1]×100%, where CTE1 represents the higher CTE value relative to CTE2. In certain instances, the plurality of abrasive particles 302 can have a CTE that is less than the CTE of the body 301. In another embodiment, the plurality of abrasive particles 302 can have a CTE that is greater than the CTE of the body 301. Still, the plurality of abrasive particles 302 can have a CTE that is not greater than about 40% different, not greater than about 30% different, not greater than about 20% different, or even not greater than about 10% different compared to the CTE of the body 301. Still, in one non-limiting embodiment, the CTE of the plurality of abrasive particles 302 may be essentially the same as the CTE of the body 301. In yet another embodiment, the CTE of the plurality of abrasive particles 302 can be at least about 0.5% different, at least about 1% different, or at least about 3% different compared to the CTE of the body 301. It will be appreciated that the plurality of abrasive particles can have a difference in CTE relative to the CTE of the body that is within a range including any of the minimum and maximum values noted above.

According to an embodiment, the plurality of abrasive particles 302 are selected from the group consisting of crushed grains, irregularly shaped grains, elongated grains, agglomerates, aggregates, and a combination thereof. In one particular instance, the plurality of abrasive particles consists essentially of crush grains, which may have a generally irregular shape. It is contemplated that the plurality of shaped abrasive particles 302 may be shaped abrasive particles of a significantly finer size compared to the body 301 of the shaped abrasive particle 301.

The body 301 of the shaped abrasive particle can have a length (L), a width (W) and a height. The length can define the longest dimension of the body 301. The width can define the second longest dimension of the body 301. The height can define the shortest dimension of the body and may extend in a direction perpendicular to the plane defined by the length and width of the body 301. According to one particular embodiment, the length can be greater than or equal to the width, and the width can be greater than or equal to the height.

In accordance with an embodiment, the body 301 of the shaped abrasive particle can have an average particle size, as measured by the largest dimension measurable on the body 301 (i.e., the length), of at least about 100 microns. In fact, the body 301 of the shaped abrasive particle can have an average particle size of at least about 150 microns, such as at least about 200 microns, at least about 300 microns, at least about 400 microns, at least about 500 microns, at least about 500 microns, at least about 600 microns, at least about 800 microns, or even at least about 900 microns. Still, the abrasive particle can have an average particle size that is not greater than about 5 mm, such as not greater than about 3 mm, not greater than about 2 mm, or even not greater than about 1.5 mm. It will be appreciated that the abrasive particle can have an average particle size within a range including any of the minimum and maximum values noted above.

The abrasive grains (i.e., crystallites) contained within the body 301 may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron. Still, the average grain size of the abrasive grains contained within the body 301 can be at least about 0.01 microns, such as at least about 0.05 microns, such as at least about 0.08 microns, at least about 0.1 microns, or even at least about 0.5 microns. It will be appreciated that the abrasive grains can have an average grain size within a range between any of the minimum and maximum values noted above.

The plurality of abrasive particles 302 may have a particular size relative to one or more dimensions of the body 301 of the shaped abrasive particle, which may facilitate improved manufacturing, deployment, and/or performance of the composite abrasive particle. For example, the plurality of abrasive particles 302 can have a median particle size (D50) that can be not greater than the length (L) of the body 301 of the shaped abrasive particle. More particularly, the plurality of abrasive particles 302 can have a median particle size (D50) that is not greater than about 90% of the length (L), such as not greater than about 80% of the length, not greater than about 70% of the length, not greater than about 60% of the length, not greater than about 50% of the length, not greater than about 40% of the length, or even not greater than about 30% of the length of the body 301. Still, in another non-limiting embodiment, the plurality of abrasive particles 302 can have a median particle size (D50) that is at least about 0.1% of the length (L), such as at least about 0.5% of the length, at least about 1% of the length, or even at least about 3% of the length of the body 301. It will be appreciated that the plurality of abrasive particles 302 can have a median particle size (D50) that is within a range including any of the minimum and maximum percentages noted above.

In another embodiment, the plurality of abrasive particles 302 can have a median particle size (D50) that is not greater than about 90% of the width (W), such as not greater than about 80% of the width, not greater than about 70% of the width, not greater than about 60% of the width, not greater than about 50% of the width, not greater than about 40% of the width, or even not greater than about 30% of the width of the body 301. Still, in another non-limiting embodiment, the plurality of abrasive particles 302 can have a median particle size (D50) that is at least about 0.1% of the width (W), such as at least about 0.5% of the width, at least about 1% of the width, or even at least about 3% of the width of the body 301. It will be appreciated that the plurality of abrasive particles 302 can have a median particle size (D50) that is within a range including any of the minimum and maximum percentages noted above.

In another embodiment, the plurality of abrasive particles 302 can have a median particle size (D50) that is not greater than about 90% of the height, such as not greater than about 80% of the height, not greater than about 70% of the height, not greater than about 60% of the height, not greater than about 50% of the height, not greater than about 40% of the height, or even not greater than about 30% of the height of the body 301. Still, in another non-limiting embodiment, the plurality of abrasive particles 302 can have a median particle size (D50) that is at least about 0.1% of the height, such as at least about 0.5% of the height, at least about 1% of the height, or even at least about 3% of the height of the body 301. It will be appreciated that the plurality of abrasive particles 302 can have a median particle size (D50) that is within a range including any of the minimum and maximum percentages noted above.

In accordance with an embodiment, the plurality of abrasive particles 302 can have a median particle size (D50) of not greater than about 1 mm, such as not greater than about 800 microns, not greater than about 500 microns, not greater than about 200 microns, not greater than about 100 microns, not greater than about 80 microns, not greater than about 60 microns, or even not greater than about 40 microns. Still, in one non-limiting embodiment, the plurality of abrasive particles 302 can have a median particle size (D50) of at least about 0.1 microns, at least about 0.5 microns, or even at least about 1 micron. It will be appreciated that the abrasive particle can have an average particle size within a range including any of the minimum and maximum values noted above.

For at least one embodiment, at least a portion of the abrasive particles of the plurality of abrasive particles are embedded in at least one surface the body 301 of the shaped abrasive particle. Moreover, in certain instances, a majority of the abrasive particles of the plurality of abrasive particles 302 can be embedded in at least one surface of the body 301 of the shaped abrasive particle. In another embodiment, at least a portion of the plurality of abrasive particles 302 can be directly bonded to at least one surface of the body 301 of the shaped abrasive particle. More particularly, at least a portion of the plurality of abrasive particles 302 can be sinter-bonded to at least one surface of the body 301 of the shaped abrasive particle. In at least one embodiment, all of the abrasive particles of the plurality of abrasive particles 302 can be sinter-bonded to at least one surface of the body 301 of the shaped abrasive particle.

Figure 4:
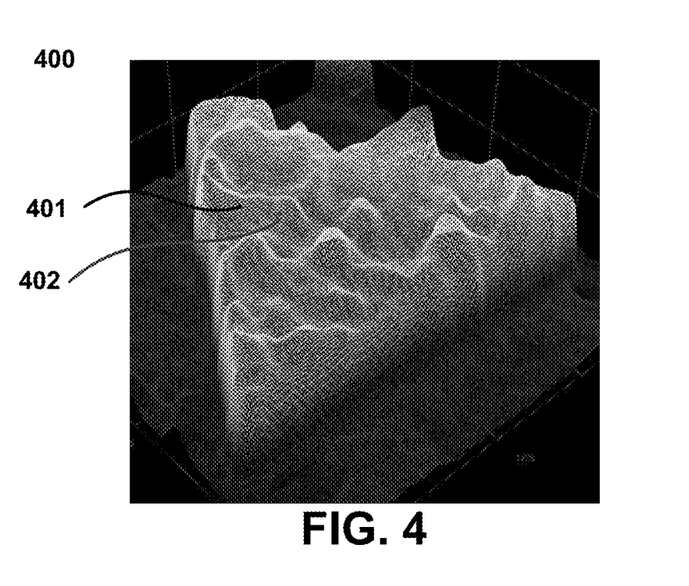
FIG. 4 includes a three-dimensional image of an abrasive particle according to an embodiment.

FIG. 4 includes a three-dimensional image of an upper surface of a composite abrasive particle according to an embodiment. As illustrated, the composite abrasive particle 400 includes a body 401 having an upper surface 402 with a plurality of abrasive particles attached thereto. As illustrated in the three-dimensional mapping image, the plurality of abrasive particles create an upper surface having a rough contour with a plurality of randomly arranged peaks and valleys. Such a rough contour may facilitate improved bonding of the composite abrasive particle in various fixed abrasive articles relative to shaped abrasive particles with smooth surfaces. Moreover, the rough contour of the upper surface 402 may facilitate improved abrasive performance in various fixed abrasives, as a greater number of sharp abrasive surfaces are present as compared to a conventional, smooth surfaced shaped abrasive particle. In certain instances, the existence of the rough contour may limit the need to deploy the abrasive particle in a particular orientation, which is generally the desired approach for conventional shaped abrasive particles, particularly in coated abrasive articles.

Figure 5:
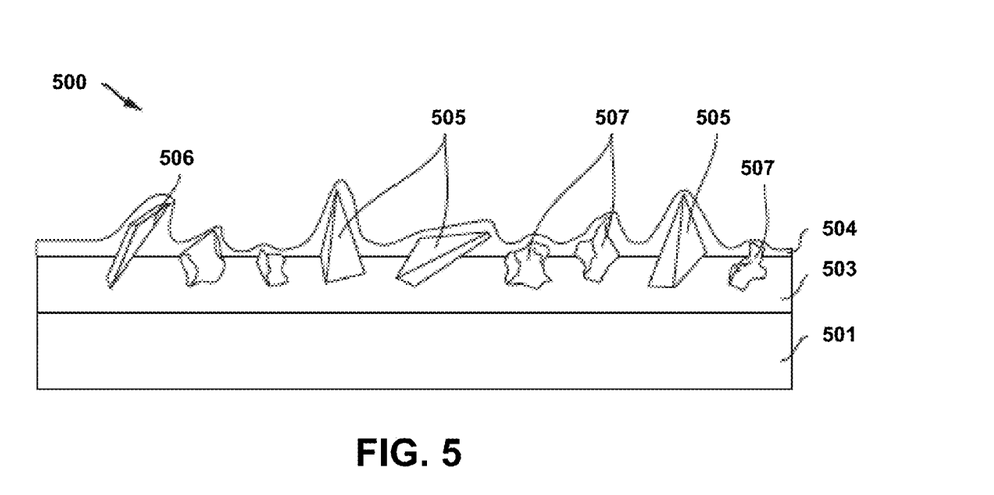
FIG. 5 includes a cross-sectional illustration of a coated abrasive according to an embodiment.

FIG. 5 includes a cross-sectional illustration of a coated abrasive article incorporating the abrasive particulate material in accordance with an embodiment. As illustrated, the coated abrasive 500 can include a substrate 501 and a make coat 503 overlying a surface of the substrate 501. The coated abrasive 500 can further include a first type of abrasive particulate material 505 in the form of a first type of shaped abrasive particle, a second type of abrasive particulate material 506 in the form of a second type of shaped abrasive particle, and a third type of abrasive particulate material in the form of diluent abrasive particles, which may not necessarily be shaped abrasive particles, and having a random shape. The coated abrasive 500 may further include size coat 504 overlying and bonded to the abrasive particulate materials 505, 506, 507, and the make coat 504.

According to one embodiment, the substrate 501 can include an organic material, inorganic material, and a combination thereof. In certain instances, the substrate 501 can include a woven material. However, the substrate 501 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 503 can be applied to the surface of the substrate 501 in a single process, or alternatively, the abrasive particulate materials 505, 506, 507 can be combined with a make coat 503 material and applied as a mixture to the surface of the substrate 501. Suitable materials of the make coat 503 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 503 can include a polyester resin. The coated substrate can then be heated in order to cure the resin and the abrasive particulate material to the substrate. In general, the coated substrate 501 can be heated to a temperature of between about 100° C. to less than about 250° C. during this curing process.

The abrasive particulate materials 505, 506, and 507 can include different types of shaped abrasive particles according to embodiments herein. The different types of shaped abrasive particles can differ from each other in composition, two-dimensional shape, three-dimensional shape, size, and a combination thereof as described in the embodiments herein. As illustrated, the coated abrasive 500 can include a first type of shaped abrasive particle 505 having a generally triangular two-dimensional shape and a second type of shaped abrasive particle 506 having a quadrilateral two-dimensional shape. The coated abrasive 500 can include different amounts of the first type and second type of shaped abrasive particles 505 and 506. It will be appreciated that the coated abrasive may not necessarily include different types of shaped abrasive particles, and can consist essentially of a single type of shaped abrasive particle. As will be appreciated, the shaped abrasive particles of the embodiments herein can be incorporated into various fixed abrasives (e.g., bonded abrasives, coated abrasive, non-woven abrasives, thin wheels, cut-off wheels, reinforced abrasive articles, and the like), including in the form of blends, which may include different types of shaped abrasive particles, shaped abrasive particles with diluent particles, and the like. Moreover, according to certain embodiments, batch of particulate material may be incorporated into the fixed abrasive article in a predetermined orientation, wherein each of the shaped abrasive particles can have a predetermined orientation relative to each other and relative to a portion of the abrasive article (e.g., the backing of a coated abrasive).

The abrasive particles 507 can be diluent particles different than the first and second types of shaped abrasive particles 505 and 506. For example, the diluent particles can differ from the first and second types of shaped abrasive particles 505 and 506 in composition, two-dimensional shape, three-dimensional shape, size, and a combination thereof. For example, the abrasive particles 507 can represent conventional, crushed abrasive grit having random shapes. The abrasive particles 507 may have a median particle size less than the median particle size of the first and second types of shaped abrasive particles 505 and 506.

After sufficiently forming the make coat 503 with the abrasive particulate materials 505, 506, 507 contained therein, the size coat 504 can be formed to overlie and bond the abrasive particulate material 505 in place. The size coat 504 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 6:
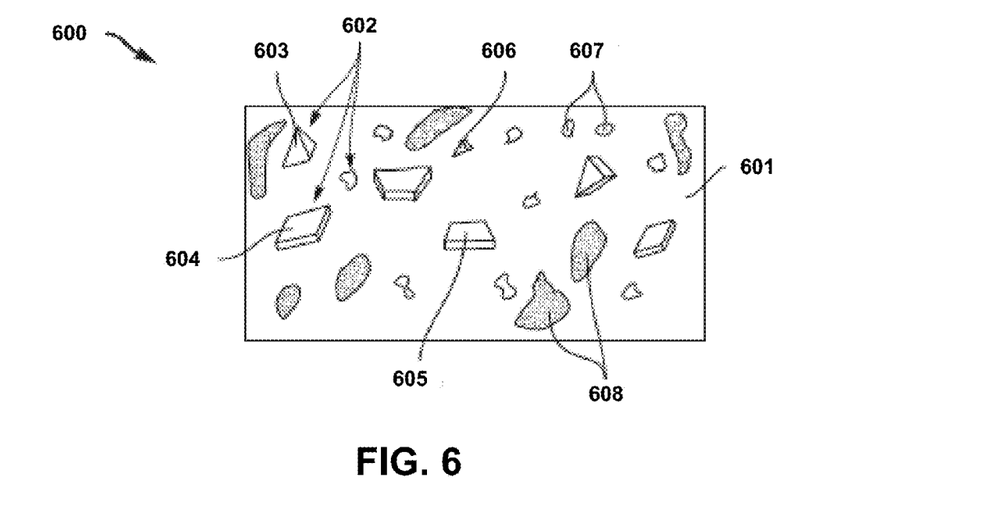
FIG. 6 includes an illustration of a bonded abrasive according to an embodiment.

FIG. 6 includes an illustration of a bonded abrasive article incorporating the abrasive particulate material in accordance with an embodiment. As illustrated, the bonded abrasive 600 can include a bond material 601, abrasive particulate material 602 contained in the bond material, and porosity 608 within the bond material 601. In particular instances, the bond material 601 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

The abrasive particulate material 602 of the bonded abrasive 600 can include different types of shaped abrasive particles 603, 604, 605, and 606, which can have any of the features of different types of shaped abrasive particles as described in the embodiments herein. Notably, the different types of shaped abrasive particles 603, 604, 605, and 606 can differ from each other in composition, two-dimensional shape, three-dimensional shape, size, and a combination thereof as described in the embodiments herein.

The bonded abrasive 600 can include a type of abrasive particulate material 607 representing diluent abrasive particles, which can differ from the different types of shaped abrasive particles 603, 604, 605, and 606 in composition, two-dimensional shape, three-dimensional shape, size, and a combination thereof.

The porosity 608 of the bonded abrasive 600 can be open porosity, closed porosity, and a combination thereof. The porosity 608 may be present in a majority amount (vol %) based on the total volume of the body of the bonded abrasive 600. Alternatively, the porosity 608 can be present in a minor amount (vol %) based on the total volume of the body of the bonded abrasive 600. The bond material 601 may be present in a majority amount (vol %) based on the total volume of the body of the bonded abrasive 600. Alternatively, the bond material 601 can be present in a minor amount (vol %) based on the total volume of the body of the bonded abrasive 600. Additionally, abrasive particulate material 602 can be present in a majority amount (vol %) based on the total volume of the body of the bonded abrasive 600. Alternatively, the abrasive particulate material 602 can be present in a minor amount (vol %) based on the total volume of the body of the bonded abrasive 600.

Item 1. An abrasive particle comprising: a shaped abrasive particle comprising a body; and a plurality of abrasive particles bonded to at least one surface of the body of the shaped abrasive particle.

Item 2. The abrasive particle of item 1, wherein the body of the shaped abrasive particle comprises a two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof.

Item 3. The abrasive particle of item 1, wherein the plurality of abrasive particles is bonded to a major surface of the body.

Item 4. The abrasive particle of item 1, wherein the plurality of abrasive particles is bonded to at least two surfaces of the body.

Item 5. The abrasive particle of item 1, wherein the plurality of abrasive particles is bonded to at least two major surfaces of the body.

Item 6. The abrasive particle of item 1, wherein the plurality of abrasive particles cover at least about 50% of the total surface area of the body or at least about 60% or at least about 70% or at least about 80% or at least about 90% or at least about 95%.

Item 7. The abrasive particle of item 1, wherein the plurality of abrasive particles are selected from the group consisting of oxides, carbides, nitrides, borides, oxycarbides, oxynitrides, oxyborides, natural minerals, synthetic materials, carbon-based materials, and a combination thereof.

Item 8. The abrasive particle of item 1, wherein the plurality of abrasive particles are selected from the group consisting of crushed grains, irregularly shaped grains, elongated grains, agglomerates, aggregates, and a combination thereof.

Item 9. The abrasive particle of item 1, wherein the body of the shaped abrasive particle comprises a length>width>height, and the plurality of abrasive particles comprise a median particle size (D50), and wherein the median particle size (D50) is not greater than the length of the body of the shaped abrasive particle or wherein the median particle size (D50) is not greater than the width of the body of the shaped abrasive particle or wherein the median particle size (D50) is not greater than the height of the body of the shaped abrasive particle.

Item 10. The abrasive particle of item 1, wherein the plurality of abrasive particles comprise at least about 10 wt % of a total weight of the abrasive particle or at least about 20 wt % or at least about 30 wt % or at least about 40 wt % or at least about 50 wt %.

Item 11. The abrasive particle of item 1, wherein the plurality of abrasive particles comprise not greater than about 80 wt % of a total weight of the abrasive particle or not greater than about 60 wt % or not greater than about 40 wt % or not greater than about 30 wt % or not greater than about 20 wt %.

Item 12. The abrasive particle of item 1, wherein the plurality of abrasive particles is embedded in the at least one surface the body of the shaped abrasive particle.

Item 13. The abrasive particle of item 1, wherein the plurality of abrasive particles is directly bonded to at least one surface of the body of the shaped abrasive particle.

Item 14. The abrasive particle of item 1, wherein the plurality of abrasive particles are sinter-bonded to the at least one surface of the body of the shaped abrasive particle.

Item 15. The abrasive particle of item 1, wherein the plurality of abrasive particles include a material having a CTE that is not greater than about 50% different than a CTE of the body of the shaped abrasive particle.

Item 16. A method of forming an abrasive particle comprising:
forming a shaped abrasive particle having a body;
attaching a plurality of abrasive particles to at least one surface of the body to form a composite abrasive particle including the shaped abrasive particle and the plurality of abrasive particles.

Item 17. The method of item 16, wherein forming a shaped abrasive particle includes forming a precursor shaped abrasive particle and attaching the plurality of abrasive particles to at least one surface of the precursor shaped abrasive particle, wherein the process further comprises drying the precursor shaped abrasive particle and plurality of abrasive particles, wherein the process further comprises calcining the precursor shaped abrasive particle and plurality of abrasive particles, wherein the process comprises sintering the precursor shaped abrasive particle and plurality of abrasive particles to form a composite shaped abrasive particle.

Item 18. The method of item 16, wherein the plurality of abrasive particles is attached the body of the shaped abrasive particle prior to substantial drying of the body.

Item 19. The method of item 16, wherein attaching the plurality of abrasive particles includes depositing the plurality of abrasive particles on a surface of the body, wherein depositing includes a process selected from the group consisting of blasting, projecting, pressing, gravity coating, molding, stamping, and a combination thereof.

Item 20. The method of item 16, wherein the body of the shaped abrasive particle is formed on a production tool including a layer of abrasive particles including the plurality of abrasive particles.

Example

A gel was formed including 41.5 wt % boehmite commercially available as Reflux Catapal B and seeded with 1% alpha alumina seeds. The mixture also included 55 wt % water, 2.5 wt % nitric acid. The mixture was extruded into triangular shaped openings in a production tool. The triangular shaped openings had a length of 2.77 mm, a width of 2.4 mm and a depth of 0.53 mm. The production tool was made of metal. The surfaces of the openings in the production tool were coated with a lubricant of olive oil to facilitate removal of the precursor shaped abrasive particles from the production tool.

A plurality of unsintered particles of dried gel comprising an alpha alumina precursor material having a median particle size (D50) of 100 microns were deposited on the mixture while it resided in the openings of the production tool. No appreciable drying of the mixture occurred between the placement of the mixture in the production tool and the deposition of the plurality of particles.

The mixture was dried in the openings at approximately 50° C. for 10 minutes. The mixture was then removed from the openings of the production tool to form precursor shaped abrasive particles including a plurality of particles attached to an upper surface. After removal the precursor shaped abrasive particles were sintered at approximately 1325° C. for approximately 10 minutes to achieve 98% theoretical density. The body of the shaped abrasive particle had a length of 1550 microns, a width of 1350 microns, and a height of 300 microns. FIG. 3 includes an image of a representative composite abrasive particle formed according to Example 1.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description, with each claim standing on its own as defining separately claimed subject matter.

What is claimed is:
1. An abrasive particle comprising:
a shaped abrasive particle comprising a body; and
a plurality of abrasive particles bonded to at least one surface of the body of the shaped abrasive particle, wherein the plurality of abrasive particles includes a material having a CTE that is not greater than about 50% different than a CTE of the body of the shaped abrasive particle.

2. The abrasive particle of claim 1, wherein the body of the shaped abrasive particle comprises a two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof.

3. The abrasive particle of claim 1, wherein at least a portion of a side surface is free of the plurality of abrasive particles.

4. The abrasive particle of claim 1, wherein the plurality of abrasive particles is bonded to at least two surfaces of the body.

5. The abrasive particle of claim 1, wherein the plurality of abrasive particles is bonded to at least two major surfaces of the body.

6. The abrasive particle of claim 1, wherein the plurality of abrasive particles covers at least about 50% of the total surface area of the body.

7. The abrasive particle of claim 1, wherein the plurality of abrasive particles is selected from the group consisting of oxides, carbides, nitrides, borides, oxycarbides, oxynitrides, oxyborides, natural minerals, synthetic materials, carbon-based materials, and a combination thereof.

8. The abrasive particle of claim 1, wherein the plurality of abrasive particles is selected from the group consisting of crushed grains, irregularly shaped grains, elongated grains, agglomerates, aggregates, and a combination thereof.

9. The abrasive particle of claim 1, wherein the body of the shaped abrasive particle comprises a length>width>height, and the plurality of abrasive particles comprises a median particle size (D50), and wherein the median particle size (D50) is not greater than the height of the body of the shaped abrasive particle.

10. The abrasive particle of claim 1, wherein the plurality of abrasive particles comprises at least 10 wt % and not greater than 80 wt % of a total weight of the abrasive particle.

11. The abrasive particle of claim 1, wherein the plurality of abrasive particles is bonded to at least two major surfaces of the body of the shaped abrasive particle, and wherein at least a portion of a side surface is free of the plurality of abrasive particles.

12. The abrasive particle of claim 1, wherein the plurality of abrasive particles is embedded in the at least one surface of the body of the shaped abrasive particle.

13. The abrasive particle of claim 1, wherein the plurality of abrasive particles is bonded to at least two major surfaces of the body of the shaped abrasive particle, wherein at least a portion of a side surface is free of the plurality of abrasive particles, wherein the plurality of abrasive particles is embedded in the at least one surface of the body of the shaped abrasive particle, wherein the body comprises a polygonal two-dimensional shape as viewed in a plane defined by a length and a width of the body, wherein the body comprises alumina, wherein the plurality of abrasive particles has an irregular shape, and wherein the plurality of abrasive particles comprises alumina.

14. An abrasive particle comprising:
a shaped abrasive particle comprising a body; and
a plurality of abrasive particles sinter-bonded to at least one surface of the body of the shaped abrasive particle.

15. The abrasive particle of claim 14, wherein the plurality of abrasive particles include a material having a CTE that is not greater than 50% different than a CTE of the body of the shaped abrasive particle.

16. The abrasive particle of claim 14, wherein at least a portion of a side surface is free of the plurality of abrasive particles.

17. The abrasive particle of claim 14, wherein the plurality of abrasive particles is bonded to at least two major surfaces of the body.

18. The abrasive particle of claim 14, wherein the plurality of abrasive particles is bonded to at least two major surfaces of the body, wherein at least a portion of a side surface is free of the plurality of abrasive particles, wherein the plurality of abrasive particles is embedded in the at least one surface of the body of the shaped abrasive particle, wherein the body comprises a polygonal two-dimensional shape as viewed in a plane defined by a length and a width of the body, wherein the body comprises alumina, wherein the plurality of abrasive particles has an irregular shape, and wherein the plurality of abrasive particles comprises alumina.

19. The abrasive particle of claim 14, wherein the plurality of abrasive particles is bonded to at least two major surfaces of the body, and wherein at least a portion of a side surface is free of the plurality of abrasive particles.

20. The abrasive particle of claim 14, wherein the plurality of abrasive particles cover at least 50% of the total surface area of the body.

21. The abrasive particle of claim 14, wherein the body of the shaped abrasive particle comprises a two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof.

22. The abrasive particle of claim 14, wherein the plurality of abrasive particles is embedded in the at least one surface of the body of the shaped abrasive particle.

23. The abrasive particle of claim 14, wherein the plurality of abrasive particles is selected from the group consisting of crushed grains, irregularly shaped grains, elongated grains, agglomerates, aggregates, and a combination thereof.

24. The abrasive particle of claim 14, wherein the plurality of abrasive particles comprises at least 10 wt % and not greater than 80 wt % of a total weight of the abrasive particle.

* * * * *